United States Patent
Klink et al.

(10) Patent No.: US 6,796,613 B2
(45) Date of Patent: Sep. 28, 2004

(54) FOLDING REAR SEAT FOR VEHICLES

(75) Inventors: Josef Klink, Nagold (DE); Hans-Juergen Schlaffke, Saulgau (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/978,782

(22) Filed: Oct. 18, 2001

(65) Prior Publication Data
US 2002/0053826 A1 May 9, 2002

(30) Foreign Application Priority Data
Oct. 18, 2000 (DE) .......................................... 100 51 668

(51) Int. Cl.[7] .............................. A47C 1/10; A47C 1/02
(52) U.S. Cl. ........................ 297/410; 297/335; 297/336
(58) Field of Search ................................. 297/410, 335, 297/336; 267/71, 291, 169

(56) References Cited

U.S. PATENT DOCUMENTS

| 815,188 | A | * | 3/1906 | Mans | 267/28 |
|---|---|---|---|---|---|
| 1,880,497 | A | * | 10/1932 | Saunders | 297/452.18 |
| 3,397,911 | A | * | 8/1968 | Brosius | 297/216.12 |
| 4,124,250 | A | * | 11/1978 | Weinich | 297/335 |
| 4,411,470 | A | * | 10/1983 | Nishimura et al. | 297/410 |
| 4,545,618 | A | * | 10/1985 | Kitamura | 297/410 |
| 4,589,698 | A | * | 5/1986 | Suzuki | 297/410 |
| 5,484,189 | A | * | 1/1996 | Patterson | 297/410 |
| 5,662,368 | A | * | 9/1997 | Ito et al. | 296/65.05 |
| 5,711,505 | A | * | 1/1998 | Nemoto | 248/424 |
| 6,192,565 | B1 | * | 2/2001 | Tame | 297/61 |
| 6,290,299 | B1 | * | 9/2001 | Frisch et al. | 297/410 |

FOREIGN PATENT DOCUMENTS

| DE | 33 06 188 C2 | 2/1983 |
|---|---|---|
| DE | 4319120 | 12/1994 |
| DE | 19744562 | 4/1999 |
| DE | 62702229 | 1/2001 |

* cited by examiner

Primary Examiner—Peter M. Cuomo
Assistant Examiner—Sarah C. Burnham
(74) Attorney, Agent, or Firm—Crowell & Moring LLP

(57) ABSTRACT

A folding rear seat for vehicles, especially passenger vehicles and station wagons, includes a folding seat back and a height-adjustable neck support mounted on the seat back. The neck support is mounted on at least one support rod that supports a padded head rest and is held such that it can shift axially within a guide in the seat back. The head rest can be retracted from a temporary vertical position to a minimum possible distance between the padded head rest and the seat back in order to allow the seat back to be folded down. To ensure that the seat back can be folded down completely without removal of the neck support, and to ensure the automatic return of the neck support to a legally prescribed minimum vertical position for the padded head rest, the guide mechanism is formed by at least one guide sleeve that holds the support rod such that it can shift axially, and a spring element is positioned between the guide sleeve and the support rod, such that the spring is first tensed by the support rod when the vertical position of the neck support is reduced from the prescribed minimum vertical position for the padded head rest to the minimum possible distance, by force of pressure.

14 Claims, 2 Drawing Sheets

FOLDING REAR SEAT FOR VEHICLES

BACKGROUND AND SUMMARY OF INVENTION

This application claims the priority of Document No. 100 51 668.8, filed in Germany on Oct. 18, 2000, the disclosure of which is expressly incorporated by reference herein.

The invention relates to a folding rear seat for vehicles, especially passenger vehicles and station wagons. Preferred embodiments of the invention relate to a seat back that can pivot about a pivotal axis extending perpendicular to a longitudinal axis of a vehicle, and a height-adjustable neck support mounted on the seat back on at least one support rod that is held such that it can shift axially within a guide mechanism in the seat back; said neck support supporting a padded head rest which can be retracted from a temporary vertical position to a minimum possible distance between the padded head rest and the seat back to allow the seat back to be folded.

Folding rear seats in passenger vehicles and station wagons serve to create additional cargo space in the area behind the two front seats, wherein the rear surface of the seat back, which is folded down onto the seat or seat cushion of the rear seat, can be used as a storage surface; or wherein the whole package composed of the seat and the folded down seat back is folded up against the rear surface of the back of the front seat, allowing the space that is opened up by the rear seat to be used as additional cargo space. Due to the limited space available in a vehicle, in order for the seat backs to be folded down completely onto the seats, the neck supports must be removed from the seat backs or at least moved from their temporary vertical adjustment position to their lowest possible position, to prevent interference with the folding down of the seat back.

In one known rear seat of this type (German Patent Document DE 33 06 188 C2), a recessed, padded area is provided in the upholstery of the seat back, and the neck support and the padded area are coordinated kinematically with one another such that when the seat back is folded down against the force of a readjusting spring, the padded section is moved in front of the seat back, at a distance from its upper edge, and the padding of the neck support becomes engaged in the recessed area that is opened up. When the seat is folded back up, the readjusting spring serves to ensure that the neck support, and thus necessarily the padded head rest, returns to its original position. In order to achieve these kinematics, the two rods that support the padded head rest are held within sleeves, which are fastened within a carriage that is mounted in the guide mechanism. The support rods for the neck support are oriented within the sleeves such that they can shift axially, and the neck support is locked in at each vertical position through catch devices in the sleeve. The readjusting spring is positioned between the carriage and the seat back, and a cable that gets shorter when the seat back is folded down is engaged in the carriage. In order to direct the padded head rest into the recess created by the padded component when the seat is being folded down, the head rest must first be moved from its temporary vertical position to its lowest possible position, the so-called minimum possible distance, by pressing down on catch devices between the support rods and the sleeves, and pushing the padded head rest down by hand until its lower edge rests against the upper edge of the seat back. The vertical position the padded head rest was in before the seat was folded down must then be reset manually by pulling the neck support from its minimum position while pressing down on the catch devices.

The prescribed legal safety standards for passenger vehicles provide that when the rear seat is being used, the padded head rest may not go below a certain vertical adjustment position, which represents a minimum limit for use of the neck support. This minimum point for the vertical position of the padded head rest is 750 mm, measured from the so-called SAP. However, when the seat back is folded down, due to limited spatial relationships, especially in vehicles in the compact class, the neck support must necessarily fall below this minimum limit.

An object of the invention is to ensure, with a seat back of the type described at the beginning and through technically simple means, that after the seat back has been returned to its original position for use as a seat, the padded head rest, which was pushed down below the allowable limit when the seat back was folded down, will automatically return to its prescribed minimum vertical position.

The object is attained in accordance with preferred embodiments of the invention by providing a rear seat comprising a seat back that can pivot about a pivotal axis extending perpendicular to a longitudinal axis of a vehicle, and a height-adjustable neck support mounted on the seat back on at least one support rod that is held such that it can shift axially within a guide mechanism in the seat back. The neck support supports a padded head rest which can be retracted from a temporary vertical position to a minimum possible distance between the padded head rest and the seat back to allow the seat back to be folded. The guide mechanism is formed by at least one guide sleeve that holds the support rod such that it can shift axially. A spring element is positioned between the guide sleeve and the support rod such that the spring element is first tensed by the support rod when the height of the neck support is reduced by force of pressure from a prescribed vertical position for the padded head rest to a predetermined minimum distance. The spring element is operable to push the support rod back to the prescribed vertical position for the padded head rest when the force of pressure has been removed.

The folding rear seat specified in the invention offers the advantage that, without a constructive redesigning of the neck support or the mounts for the neck support in the seat back, but rather merely by incorporating a simple, spring element, the neck support can be pushed into the seat back the small amount that is required to permit the seat back to be folded down, while ensuring that when the seat back is folded back up for use as a seat, the padded head rest will automatically return to its legally prescribed, preset minimum vertical position, without any help from the user. The neck support is pushed down from the legally prescribed vertical position for the padded head rest in that when the padded head rest reaches the rear surface of the seat back of the front seat, the seat back is swiveled further, causing the padded head rest, under tension from the spring element and the support rods, to follow the contours of the rear surface of the back of the front seat. If the axis of rotation for the seat back is in the seat cushion of the rear seat, and the seat cushion itself can also be folded up on an axis of rotation located at the front of the seat cushion, then, when the seat cushion, with its seat back folded down on top of it, is folded up against the rear surface of the seat back of the front seat, the force of pressure acting on the padded head rest is provided by the floor space against which the padded head rest is turned when the seat cushion is folded up. By utilizing the components in the vehicle's interior that lie along the folding pathway for the seat back, namely the front seat back and the floor, the neck support, pressed against the spring element, does not need to be locked into position, hence no means for unlocking the neck support are necessary. This also serves to keep manufacturing costs down.

Advantageous embodiments of the rear seat specified in the invention, with further developments and designs for the invention, described below and in the claims.

In accordance with one preferred embodiment of the invention, the spring element is designed as a compression spring, one end of which rests against the base of the guide sleeve, while the other end rests against a spring plate that is designed to shift axially within the guide sleeve. The spring plate operates in conjunction with a stop motion device that serves to limit the maximum block length of the compression spring, and is mounted in the guide sleeve such that the spring plate rests against the end of the support rod when the padded head rest is in its prescribed vertical position. Preferably, the spring plate is also held on a threaded bolt that extends into the sleeve through its base, and the stop motion device is formed by the bolt head or by a counter nut that is screwed onto the end of the bolt. To adjust the neck support to a vertical position that is comfortable for the individual user, the padded neck support must be moved manually, as is known in the art, out of its prescribed vertical position by pressing down on the catch device between at least one guide sleeve and at least one support rod.

Other objects, advantages and novel features of the present invention will become apparent from the following detailed description of the present invention when considered in conjunction with the accompanying drawing.

DETAILED DESCRIPTION OF THE DRAWINGS

Figure 1:
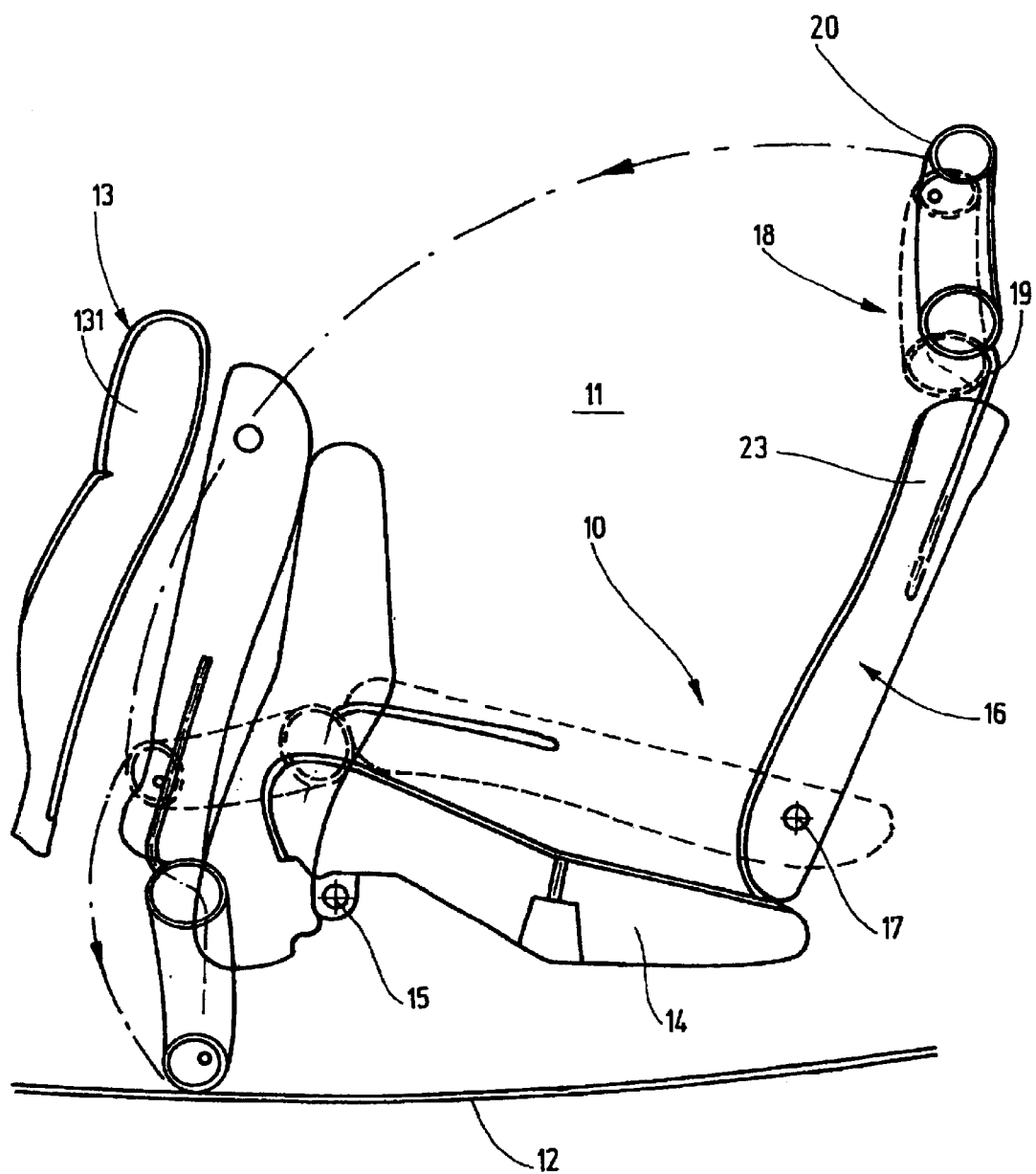
FIG. 1 is a side schematic view of a rear seat with seat cushion, seat back, and neck support constructed according to a preferred embodiment of the present invention.

The rear seat 10 shown in a schematic side view in FIG. 1, positioned in the interior 11 of a passenger vehicle or station wagon, behind a front seat 13, shown here as a section of the seat back 131. Rear seat 10 comprises a seat cushion 14, fastened by a manually operable locking device, not illustrated here and located on the floor of the vehicle 12, and which is designed to turn around a fixed axis of rotation 15, located underneath a forward area of the seat cushion 14. A seat back 16 is mounted on the seat cushion 14 with a so-called seat brace, not illustrated here, such that it also can pivot about its axis of rotation 17 extending crosswise to the longitudinal axis of the vehicle, and parallel to the axis of rotation 15 for the seat cushion 14.

The seat back 16 is equipped with a neck support 18, composed of two parallel support rods 19 and a padded head rest 20 held up by the two support rods 19. The two support rods 19 may also be connected by a cross piece that supports the padded head rest 20, thus forming a single, U-shaped component. The neck support 18 is mounted such that it can shift axially within a guide mechanism 21 inside the seat back 16, and can be shifted to place the padded head rest 20 in the vertical position desired by the passenger in the seat, in order to provide optimum support for the passenger's head. The guide mechanism 21 is equipped with two guide sleeves 22, positioned equidistant from one another with the support rods 19, and designed to hold the shifting support rods; the guide sleeves are integrated into the upholstery 23 of the seat back 16, and are mounted in the back area of the seat back 16, not illustrated here. The guide sleeves 22 are closed off at the bottom by a sleeve base 222, while the ends of the sleeves opposite their base rest against a flanged cover 221 in the seat back upholstery 23.

Figures 2, 3:
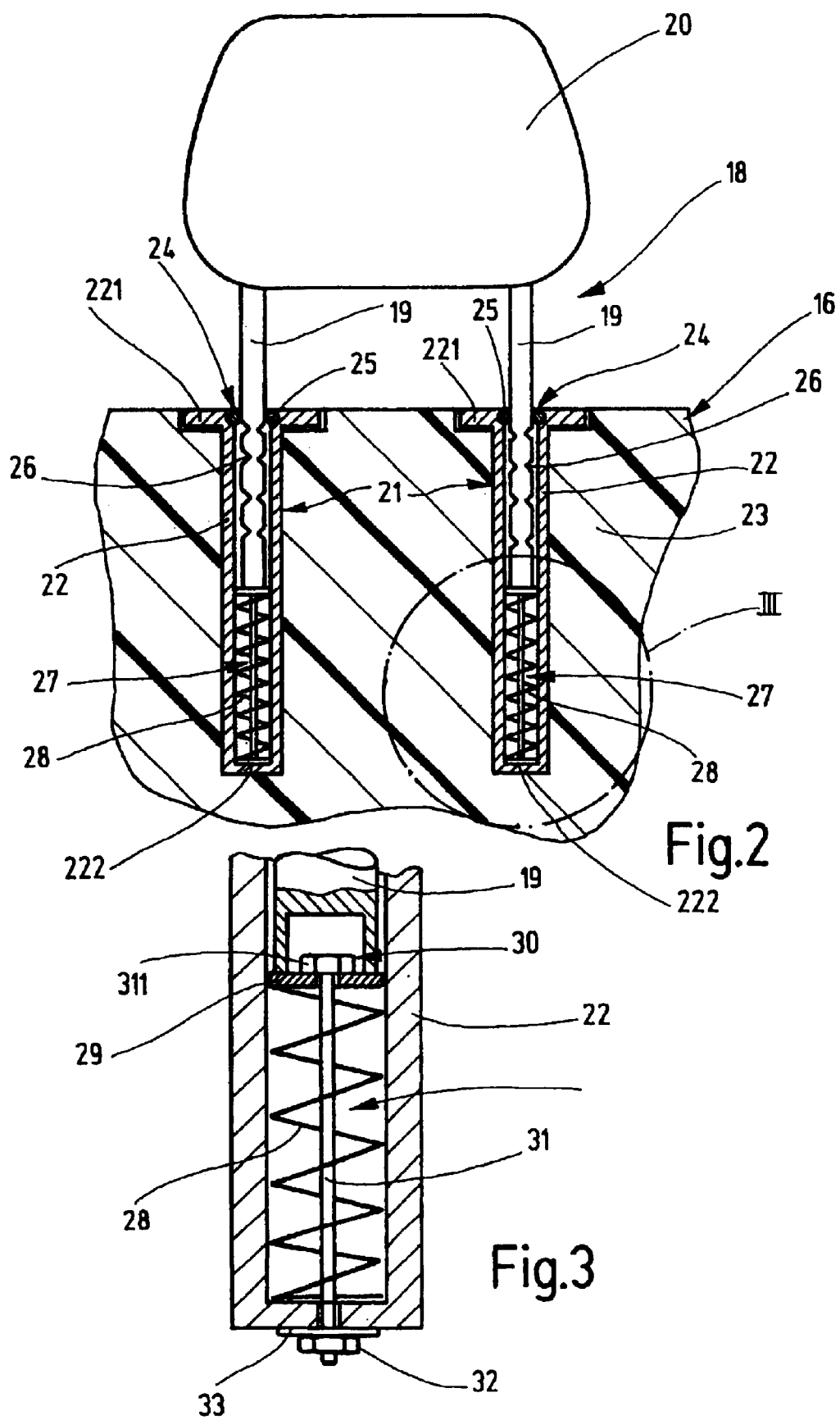
FIG. 2 is a front view of an enlarged section of the seat back of FIG. 1, including the neck support and shown in a partial cross-section.
FIG. 3 is an enlarged representation of the Section III in FIG. 2.

In FIGS. 1 and 3 the neck support 18 is shown in a vertical position in which the padded head rest 20 is in its prescribed position. This prescribed vertical position for the padded head rest 20, which is 750 mm above the so-called SAP, corresponds to a minimum vertical position for the neck support 18 that must be complied with and may not be moved below when the seat is in use, in accordance with standard safety regulations for passenger vehicles. In FIG. 1, the neck support 18 is also shown by a dashed line, in a position in which the lower edge of the padded head rest 20 rests against the upper edge of the seat back 16, and the padded head rest 20 is at its minimum possible distance from the seat back 16. In the area above the preset vertical position for the padded head rest 20, the neck support 18 can be adjusted vertically by pushing it up or down manually, allowing the padded headrest 20 to be placed in the position that will provide optimum support for the head of the passenger in the seat. This height adjustment for the neck support 18 is accomplished through known means, by pressing down on a catch device 24 that operates in each guide sleeve 22 between the sleeve and the support rod 19 held therein. As is seen in FIG. 2, each catch device 24 is composed of two diametrically opposite catch elements 25 in the guide sleeve 22, and two rows of notches 26 in the support rods 19, wherein the two rows of notches are positioned diametrically opposite one another on each support rod 19, and are each turned to face a catch element 25. Each row of notches 26 operates in conjunction with one catch element 25. The catch devices 24 are positioned such that they will work only at vertical positions for the neck support that are above the minimum vertical position for the neck support 18, shown in FIG. 2, at the predefined vertical position for the padded head rest 20.

If the seat back 16 of the rear seat 10 is to be folded down around its axis of rotation 17 onto the seat cushion 14, in order to obtain additional cargo space behind the front seat 13 of the passenger vehicle, then, due to the amount of space available between the seat back and the rear surface of the seat back of the front seat 13, it is necessary to place the padded head rest 20 of the neck support 18 at a minimum possible distance from the seat back 16, so that the upper edge of the padded head rest 20 can turn along the rear surface of the seat back of the front seat 131. In order to maintain safety standards, when the seat back 16 is returned to its original position it must also be ensured that the padded head rest 20 will automatically return to the prescribed vertical position without any help from the user. In order to accomplish this, a spring element 27 is positioned inside each guide sleeve 22, between the support rod 19 and the guide sleeve 22, such that the spring is tensed by the support rod 19 when the vertical position of the neck rest 18 is forced below the prescribed vertical position for the padded head rest 20. When the padded head rest 20 has reached the minimum possible distance, then the spring element 27 is tensed (compressed) to such a degree that when the force of pressure is removed, the spring pushes the support rod 19 back far enough to place the padded head rest back in its prescribed vertical position, as illustrated in FIG. 2.

In the described exemplary embodiment the spring element 27 is designed as a compression spring 28, one end of which rests against the sleeve base 222 of the guide sleeve, while the other end rests against a spring plate 29 that is designed to shift axially within the guide sleeve 22. In order to give the compression spring 28 sufficient force to push the neck support 18 back, without pushing the neck support 18 beyond the prescribed vertical position for the padded head rest 20, a stop motion device 30 is provided in the guide sleeve 22, which limits the pathway for the compression spring 28 to a maximum block length for the compression spring 28. To this end, the spring plate 29 is held on a threaded bolt 31, which extends through the sleeve base 222 of the guide sleeve 22 into the guide sleeve 22, and outside is secured to the sleeve base 22 by a counter nut 32 with a locking washer 33. The bolt head 311 that lies at the opposite end from the sleeve base 222 forms the stop motion device 30 for the spring plate 29. The bolt head 311 and the counter nut 32 can be exchanged, allowing the latter to form the stop motion device 30. Because the notches 26 in the support rods 19 are positioned exclusively in the area of the inserted support rods 19 that corresponds to the prescribed vertical position for the padded head rest 20, the catch devices 24 will not engage in the shifting area for the neck support 18 between the minimum possible distance and the prescribed vertical position for the padded head rest 20.

In FIG. 1, the position of the seat back 16 with the neck support 18 is shown as a dashed line when it is folded down, with the front surface of the seat back resting on the upper surface of the seat cushion. Now, the seat cushion 14, with the folded down seat back 16, can be swiveled forward around its axis of rotation 15, in the direction of the front seat 13, until the rear surface of the seat back 16 rests against the rear surface of the seat back of the front seat 131. The position of the so-called rear seat package 10 is shown in FIG. 1 to the left, behind the front seat 13. In the movement required to rotate the folded rear seat 10 in its package position, the upper edge of the padded head rest 20 of the neck support 18 is pressed against the floor of the vehicle 12, and, with the further turning of the rear seat 10, is pushed a short distance along the floor of the vehicle 12, wherein pressure acts upon the padded head rest 20, serving to shift the padded head rest 20 in the direction of the upper edge of the seat back 16, by pushing the neck support 18 in the seat back 16.

The invention is not limited to the exemplary embodiment for the rear seat 10 as illustrated in FIG. 1. For instance, the axis of rotation 17 for the seat back 16 can be fixed within the vehicle, but positioned off the floor of the vehicle 12. In this case, when the rear seat 10 is folded down, first the seat cushion 14 is folded up to meet the rear surface of the seat back 131 of the front seat 13, after which the seat back 16 is folded forward around its axis of rotation 17. In this case, the padded head rest 20 of the neck support 18 presses against the underneath side of the raised seat cushion 14, and with the further turning movement of the seat back 16, the padded head rest 20 is pushed by the seat cushion 14 far enough into the seat back 16 that the it is able to slide along the underneath side of the seat cushion 14.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within scope of the present invention.

What is claimed is:

1. Folding rear seat for passenger vehicles, comprising:
   a seat back that can pivot about a pivotal axis extending perpendicular to a longitudinal axis of a vehicle, and
   a height-adjustable neck support mounted on the seat back on at least one support rod that is held such that it can shift axially within a guide mechanism in the seat back; said neck support supporting a padded head rest which can be retracted from a temporary vertical position to a minimum possible distance between the padded head rest and the seat back to allow the seat back to be folded,
   wherein the guide mechanism is formed by at least one guide sleeve that holds the support rod such that it can shift axially;
   wherein a spring element is positioned between the guide sleeve and the support rod such that the spring element is first tensed by the support rod when a height of the neck support is reduced by a force of pressure from a prescribed vertical position for the padded head rest to a predetermined minimum distance; and
   wherein the spring element is operable to push the support rod back to the prescribed vertical position for the padded head rest when the force of pressure has been removed after the seat back has been returned to a usable seat position
   wherein the spring element is designed as a compression spring, one end of which rests against a base of the guide sleeve, while the other end rests against a spring plate that is allowed to shift within the guide sleeve; and
   wherein the spring plate operates in conjunction with a stop motion device that serves to limit a maximum block length of the compression spring such that the spring plate lies against an end of the support rod when the padded head rest is in its prescribed vertical position, wherein the spring plate is held on a threaded bolt that extends through the base of the guide sleeve into the guide sleeve, and
   wherein the stop motion device is formed by one of a bolt head or a counter nut that is screwed onto an end of the bolt.

2. Rear seat in accordance with claim 1, wherein a catch device designed to hold the neck support in its desired vertical position is located between the support rod and the guide sleeve, the catch device being configured to function only when the neck support is at a vertical position in which the padded head rest lies above its prescribed vertical position.

3. Rear seat in accordance with claim 1, wherein a catch device designed to hold the neck support in its desired vertical position is located between the support rod and the guide sleeve, the catch device being configured to function only when the neck support is at a vertical position in which the padded head rest lies above its prescribed vertical position.

4. Rear seat in accordance with claim 2, wherein the catch device is composed of at least one catch element that protrudes into the guide sleeve and a row of notches on the support rod which are designed such that engagement of the catch element and respective ones of the notches can be overcome by applying pressure to the support rod.

5. Rear seat in accordance with claim 3, wherein the catch device is composed of at least one catch element that protrudes into the guide sleeve and a row of notches on the support rod which are designed such that engagement of the catch element and respective ones of the notches can be overcome by applying pressure to the support rod.

6. Rear seat in accordance with claim 1, wherein the pivot axis for the seat back is located on a seat cushion, which seat cushion is designed to pivot about a seat cushion axis of rotation that is located at its forward end and extends perpendicular to the longitudinal axis of the vehicle.

7. Rear seat in accordance with claim 1, wherein the pivot axis for the seat back is fixed within the vehicle in a position that is above a floor of the vehicle.

8. Folding rear seat according to claim 1, wherein the at least one support rod includes a pair of similar support rods held in respective similar guide sleeves.

9. A head rest assembly for a passenger vehicle seat of the type having a back rest movable between an in use upright position and a folded down position, said head rest assembly comprising:

a padded head rest;

a guide sleeve fixedly disposable in a seat backrest;

a support rod connected to the head rest, said support rod being axially movable in said guide sleeve between an in use position supporting the head rest above an upper end of the guide sleeve at a predetermined minimum in use distance and a stowage position supporting the head rest at a closer spacing than the minimum in use distance for accommodating movement of a seat back rest with the guide sleeve to a folded down position; and a spring assembly in said guide sleeve operable to automatically push the support rod and head rest by said minimum in use distance above the upper end of the guide sleeve when pressure on the head rest and support rod is relieved after the backrest is operably moved out of the folded down position wherein the spring element is designed as a compression spring, one end of which rests against a base of the guide sleeve, while the other end rests against a spring plate that is allowed to shift within the guide sleeve; and wherein the spring plate operates in conjunction with a stop motion device that serves to limit a maximum block length of the compression spring such that the spring plate lies against an end of the support rod when the padded head rest is in its prescribed vertical position, wherein the spring plate is held on a threaded bolt that extends through the base of the guide sleeve into the guide sleeve, and wherein the stop motion device is formed by one of a bolt head or a counter nut that is screwed onto an end of the bolt.

10. A head rest assembly according to claim 9, wherein the spring assembly includes a compression spring interposed in the guide sleeve between the support rod and a bottom of the guide sleeve.

11. A head rest assembly according to claim 9, wherein a catch device designed to hold the neck support in its desired vertical position is located between the support rod and the guide sleeve, the catch device being configured to function only when the neck support is at a vertical position in which the padded head rest lies above its prescribed vertical position.

12. A head rest assembly in accordance with claim 9, wherein a catch device designed to hold the neck support in its desired vertical position is located between the support rod and the guide sleeve, the catch device being configured to function only when the neck support is at a vertical position in which the padded head rest lies above its prescribed vertical position.

13. A head rest assembly in accordance with claim 10, wherein the catch device is composed of at least one catch element that protrudes into the guide sleeve and a row of notches on the support rod which are designed such that engagement of the catch element and respective ones of the notches can be overcome by applying pressure to the support rod.

14. A head rest assembly according to claim 13, wherein the catch device is composed of at least one catch element that protrudes into the guide sleeve and a row of notches on the support rod which are designed such that engagement of the catch element and respective ones of the notches can be overcome by applying pressure to the support rod.

* * * * *